(12) United States Patent
Gebhardt et al.

(10) Patent No.: US 8,396,674 B2
(45) Date of Patent: Mar. 12, 2013

(54) VIBRATION-TYPE MEASURING DEVICE

(75) Inventors: Jörg Gebhardt, Mainz (DE); René Friedrichs, Göttingen (DE); Beat Kramer, Windisch (CH); Frank Kassubek, Rheinfelden (DE); Steffen Keller, Constance (DE)

(73) Assignee: ABB Technology AG, Zurich (CH)

( * ) Notice: Subject to any disclaimer, the term of this patent is extended or adjusted under 35 U.S.C. 154(b) by 633 days.

(21) Appl. No.: 12/499,512

(22) Filed: Jul. 8, 2009

(65) Prior Publication Data

US 2010/0005887 A1 Jan. 14, 2010

(30) Foreign Application Priority Data

Jul. 8, 2008 (DE) .................... 10 2008 031 895
Sep. 11, 2008 (DE) .................... 10 2008 046 891

(51) Int. Cl.
*G01F 1/00* (2006.01)
*G01H 17/00* (2006.01)
*G06F 19/00* (2011.01)
*G06F 17/40* (2006.01)

(52) U.S. Cl. ...... 702/45; 73/668; 73/861.356; 73/865.8; 700/33; 702/56; 702/71; 702/187; 702/189; 708/200

(58) Field of Classification Search .................... 73/570, 73/649, 662, 663, 667, 668, 861, 861.18, 73/861.351, 861.354, 861.355, 861.356, 73/865.8, 865.9; 331/1 R, 154, 187; 700/1, 700/28, 32, 33, 90; 702/1, 57, 66, 71, 72, 702/127, 187, 189, 33, 45, 56; 708/100, 708/105, 131, 161, 200

See application file for complete search history.

(56) References Cited

U.S. PATENT DOCUMENTS 4,692,649 A * 9/1987 Izukawa et al. .......... 310/316.02
4,749,896 A * 6/1988 Suzuki et al. ............ 310/316.02
(Continued)

FOREIGN PATENT DOCUMENTS

DE       101 17 107 A1    10/2002
DE  10 2006 031 198 A1     1/2008
(Continued)

OTHER PUBLICATIONS

Jože Kutin et al., "Phase-locking control of the Coriolis meter's resonance frequency based on virtual instrumentation", Science Direct, 2003, pp. 86-93.

*Primary Examiner* — Edward Cosimano
(74) *Attorney, Agent, or Firm* — Buchanan Ingersoll & Rooney PC

(57) ABSTRACT

A vibration-type measuring device includes an exciter arrangement which exerts a time-dependent force with at least one sinusoidal component at an adjustable excitation frequency on a measuring tube, through which a medium can flow, and causes the measuring tube to oscillate. The measuring device includes first and second sensors which are fitted to the measuring tube at different locations. The first and second sensors output first and second measurement signals, respectively. The measuring device includes an evaluation unit which determines a first phase shift between the first and second measurement signals and uses the determined phase shift to determine a measurement variable of the medium. The measuring device includes a phase comparator, which determines a second phase shift between the force and the average value of the first and second measurement signals, and a frequency generator which sets the excitation frequency on the basis of the second phase shift.

14 Claims, 1 Drawing Sheet

U.S. PATENT DOCUMENTS

| | | | |
|---|---|---|---|
| 4,794,294 A * | 12/1988 | Shimizu et al. | 310/316.02 |
| 4,801,897 A | 1/1989 | Flecken | |
| 4,833,358 A * | 5/1989 | Suzuki et al. | 310/316.02 |
| 5,136,215 A * | 8/1992 | Izukawa | 318/116 |
| 5,146,143 A * | 9/1992 | Furutsu | 318/116 |
| 7,183,691 B2 * | 2/2007 | Yamamoto | 310/316.01 |
| 2003/0216874 A1 * | 11/2003 | Henry et al. | 702/54 |
| 2005/0067921 A1 * | 3/2005 | Yamamoto | 310/317 |
| 2011/0035166 A1 * | 2/2011 | Henry et al. | 702/48 |

FOREIGN PATENT DOCUMENTS

| | | |
|---|---|---|
| DE | 10 2007 059 804 A1 | 6/2008 |
| DE | 10 2008 046 891 A1 * | 1/2010 |
| EP | 0 262 573 A2 | 4/1988 |
| EP | 0 926 473 A2 | 6/1999 |

* cited by examiner

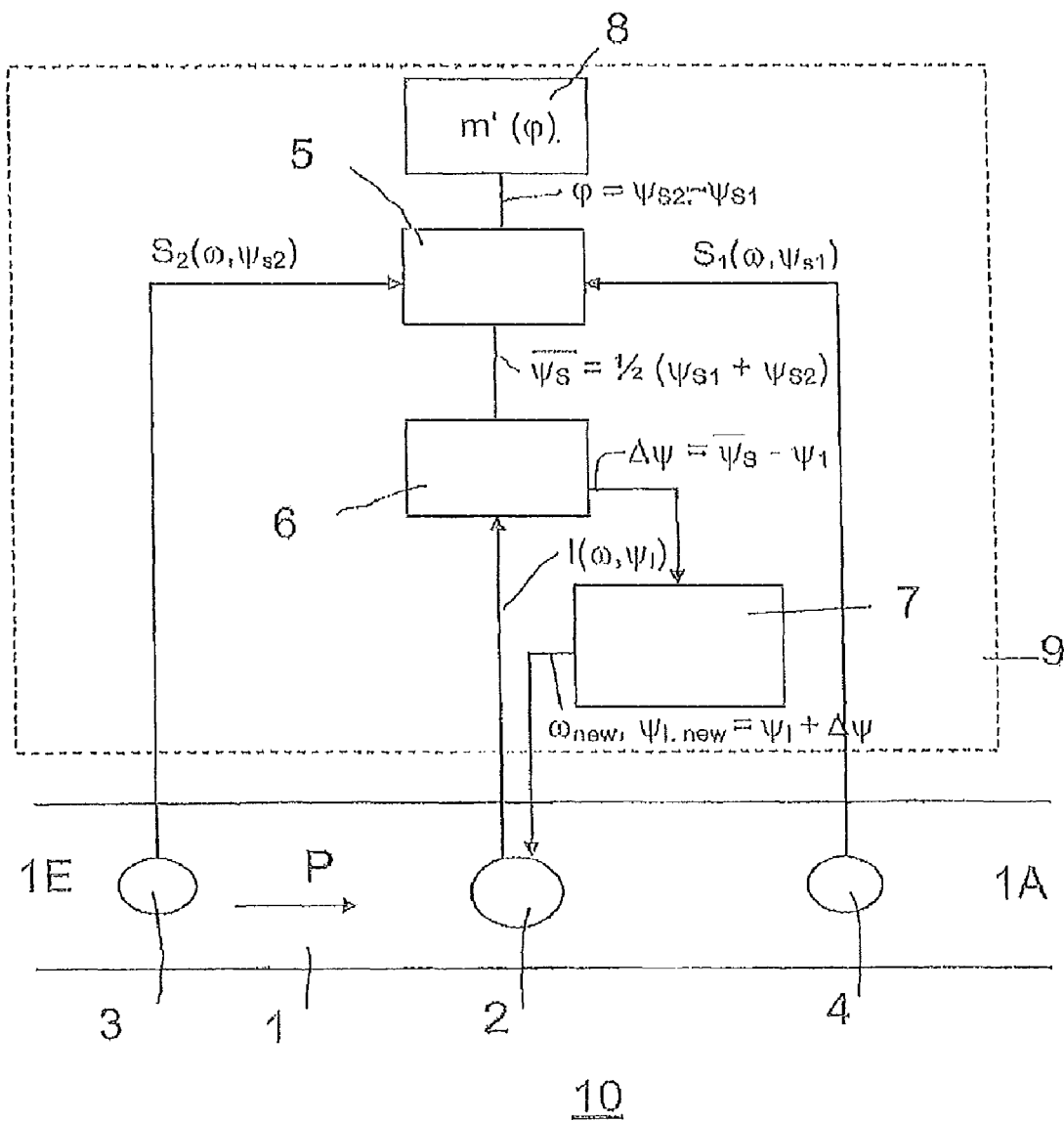
Legend:
1 - Meauring tube
2 - Exciter arrangement (actuator)
3 - Measuring sensor
4 - Measuring sensor
5 - Evaulation unit
6 - Phase comparator
7 - Frequency generator
8 - Display unit
9 - Electronic unit
10 - Measuring device

VIBRATION-TYPE MEASURING DEVICE

RELATED APPLICATIONS

This application claims priority under 35 U.S.C. §119 to German Patent Application No. 10 2008 031 895.7 filed in Germany on Jul. 8, 2008 and German Patent Application No. 10 2008 046 891.6 filed in Germany on Sep. 11, 2008, the entire contents of which are hereby incorporated by reference in their entirety.

FIELD

The present disclosure relates to a vibration-type measuring device having an exciter arrangement which can exert a time-dependent force F ($\omega$, $\psi_F$) on a measuring tube, through which a medium can flow, and thereby cause the measuring tube to oscillate.

The present disclosure also relates to a method for operating a vibration-type measuring device in which an exciter arrangement can exert a time-dependent, periodic force F ($\omega$, $\psi_F$) on a measuring tube, through which a medium can flow, and thereby cause the measuring tube to oscillate.

An exemplary embodiment provides a vibration-type measuring device of the generic type that can include an exciter arrangement, which can exerts a time-dependent force F ($\omega$, $\psi_F$) with at least one sinusoidal, for example harmonic, component or else one non-sinusoidal, that is to say non-harmonic, component at an adjustable excitation frequency $\omega$ on a measuring tube, through which a medium can flow, and which thus causes the measuring tube to oscillate. The exemplary measuring device can also include a first measuring sensor and a second measuring sensor which are fitted to the measuring tube at different locations and output a first measurement signal S1 ($\omega$, $\psi_{S1}$) and a second measurement signal S2 ($\omega$, $\psi_{S2}$), respectively, and also an evaluation unit which determines a first phase shift between the first and second measurement signals and uses it to determine a measurement variable of the medium.

BACKGROUND INFORMATION

Vibration-type measuring devices of the generic type are also referred to as Coriolis flow sensors. They can be used to measure the flow rate of a fluid medium flowing through the measuring tube. Other parameters of the medium, for example the viscosity or the density of the medium, can also be measured either in addition to the flow rate or on their own.

A Coriolis flow sensor has a frequency characteristic with a greatly pronounced resonant frequency $\omega_0$ or $f_0$ (it is known that the connection between $\omega_0$ and $f_0$ is given by the relationship $\omega_0 = 2\pi \times f_0$) in the balanced mode. The measurement variable can be determined with excitation at this resonant frequency since the amplitudes of the measured signals are at a maximum at the resonant frequency.

However, during actual operation of the Coriolis flow sensor, the resonant frequency $f_0$ is shifted on account of external and internal influences, primarily with the density $\rho$ of the medium inside the measuring tube. Furthermore, the resonant frequency $f_0$ can also change as a function of the temperature and other environmental conditions.

Therefore, Coriolis flow sensors have control and evaluation electronics whose aim is to always excite the system at the resonant frequency $f_0$.

In one application, as shown in DE 10 2007 059 804, for example, the excitation is effected by means of torsion in the centre of the measuring tube.

Sensors ($S_1$ and $S_2$) which register the deflections of the measuring tube and thus record the excitation frequency f are used to measure the phase shift of these points with respect to the excitation and are symmetrical with respect to the excitation (upstream and downstream). The condition for resonance of the system is achieved as soon as the current through the actuator $I_{actuator}$ and the average phase shift of the sensor signals are in phase. The current through the actuator can be a measure of the excitation force in the plunger-type armature sensors, which are often used as the actuator.

The actual measurement variable of the Coriolis flow sensor is the phase shift f between the sensor signals $S_1$ and $S_2$ (upstream and downstream of the excitation) during excitation at the resonant frequency $f_0$. This signal corresponds to the mass flow rate (m') of the Coriolis flow sensor.

If another measurement variable, for example the viscosity of the measurement medium, is intended to be detected, only one sensor is required under certain circumstances. In that case, the attenuation of the sensor signal is measured, for example, and is used to determine the viscosity, or else the change in the phase angle of the one sensor signal based on the exciting force could be measured and could then be used to determine the viscosity or else the density.

However, the common feature of all measurement methods nowadays is a desire to measure at the resonant frequency as far as possible.

In order to track the resonant frequency in the event of a change in the system, a control loop in known Coriolis flow sensors controls the excitation frequency until the resonance condition has been satisfied, that is to say until the average value of the phases of the sensor signals is in phase with the excitation current. In the case of a viscosimeter having only one sensor, the frequency would accordingly be controlled until the phase of the one sensor signal were in phase with the excitation current. For this purpose, the frequency must be varied until the phases of the signals satisfy the condition.

However, this operation requires a certain amount of time on account of internal mechanical compensation or relaxation processes. If a new frequency is applied, the device still oscillates for a time with the phase associated with the old frequency and it takes a certain amount of time before this "shifted component" of the mechanical oscillation has disappeared as a result of attenuation. It is thus necessary to wait for some time before the new phase associated with the new frequency can be reliably measured; to be precise, the longer the wait, the better the quality of the system. The speed at which the natural frequency can be tracked is thus limited by the mechanical relaxation of the system.

SUMMARY

An exemplary embodiment provides a vibration-type measuring device comprising an exciter arrangement configured to exert a time-dependent, periodic force on a measuring tube arranged to allow a medium to flow therethrough, and to cause the measuring tube to oscillate. The exemplary measuring device also comprises a phase comparator configured to determine a phase shift between the force and a sensor signal. In addition, the exemplary measuring device comprises a frequency generator configured to set an excitation frequency and a phase of the force to be exerted by the exciter arrangement, on the basis of the phase shift determined by the phase comparator.

An exemplary embodiment provides a method of operating a vibration-type measuring device. The exemplary method comprises exerting a time-dependent, periodic force on a measuring tube arranged to allow a medium to flow therethrough, to cause the measuring tube to oscillate. The exemplary method comprises determining a phase shift between the force and a sensor signal, and setting an excitation frequency and/or a phase of the force to be exerted on the basis of the determined phase shift.

An exemplary embodiment provides a vibration-type measuring device. The exemplary measuring device comprises an exciter arrangement configured to exert a time-dependent, periodic force on a measuring tube arranged to allow a medium to flow therethrough, and to cause the measuring tube to oscillate. The exemplary measuring device also comprises a first measuring sensor fitted to a first side of the measuring tube, and configured to output a first measurement signal, and a second measuring sensor fitted to a second side of the measuring tube opposite to the first side of the measuring tube, and configured to output a second measurement signal. In addition, the exemplary measuring device comprises an evaluation unit configured to determine a phase shift between the first and second measurement signals and determine a measurement variable of the medium flowing through the measuring tube on the basis of the determined phase shift.

BRIEF DESCRIPTION OF THE DRAWING

Further advantages, improvements and refinements of the present disclosure are explained in more detail below with reference to exemplary embodiments which are illustrated in the attached drawing, in which:

The drawing shows a schematic illustration of an exemplary measuring device according to at least one embodiment.

DETAILED DESCRIPTION

Exemplary embodiments of the present disclosure provide a vibration-type measuring device of the generic type, in which the tracking of the resonant frequency is faster, and provide a method for operating a vibration-type measuring device, which ensures fast tracking of the resonant frequency.

According to the disclosure, the measuring device thus comprises a phase comparator, which determines a phase shift $\Delta\psi$ between the force F and a sensor signal or the average value of at least one first sensor signal S1 ($\omega$, $\psi_{S1}$) and one second sensor signal S2 ($\omega$, $\psi_{S2}$), and a frequency generator which sets the excitation frequency $\omega$ and/or the phase $\psi_F$ of the force F on the basis of the phase shift $\Delta\psi$. The excitation frequency $\omega$ and/or the phase $\psi_F$ of the force F is/are advantageously controlled in such a manner that the frequency of the system corresponds to the natural frequency and the phase difference between the sensor signal or the average value of the at least first and second sensor signals and the force F becomes zero.

A generalized speed, in particular, is suitable as the sensor signal. The following is intended thereby. Conventional sensors which are used in vibration-type measuring devices of the generic type measure a generalized displacement signal, namely the deflection of the tube wall, for example. This generalized displacement signal, the deflection, is at a maximum at resonance. The phase shift between the exciting force and the generalized displacement signal is −90° at resonance. If a generalized speed signal, that is to say the derivative of the deflection according to time, is now taken as the sensor signal instead of the generalized displacement signal, resonance is characterized in that the phase shift between the exciting force and the generalized speed signal then becomes zero.

As already mentioned above, a first sensor and a second sensor are generally needed to measure the mass flow rate. One sensor suffices to measure density or viscosity. This one sensor could be one of the two sensors used to measure the flow rate. However, it could also be a separate sensor. A device which is used to measure both the mass flow rate and the density and/or viscosity could then have three or more sensors. The inventive control of the frequency and/or phase of the force excitation, as described in more detail further below using the example of the average value of two sensors, which example is to be considered as exemplary and restrictive, can be effected on the basis of only one sensor signal or on the basis of the average value of two or three or more sensor signals.

In one advantageous embodiment, the measuring device thus comprises at least one first measuring sensor and one second measuring sensor, which output the first measurement signal S1 ($\omega$, $\psi_{S1}$) and the second measurement signal S2 ($\omega$, $\psi_{S2}$), respectively, and an evaluation unit which determines the phases of at least some of the measurement signals.

In an embodiment which is also very advantageous, the evaluation unit determines a first phase shift f between the first measurement signal S1 ($\omega$, $\psi_{S1}$) and the second measurement signal S2 ($\omega$, $\psi_{S2}$) and uses it to determine a measurement variable of the medium, for example the mass flow rate.

The frequency, the amplitude and the phase can be set in a frequency generator which can be used according to the disclosure.

So that the system can be excited at the resonant frequency, the phase shift between the excitation current of the exciter arrangement (which is also referred to as actuator for short below), which is a measure of the force exerted on the measuring tube by the actuator, and the average value of the signals from the sensors is measured.

This measurement result can be used to directly program the frequency generator and the system can thus be tracked considerably faster than with control using only the frequency, as previously disclosed in the prior art.

This is because, when setting the new frequency, the new phase of the excitation signal can be set at the same time, with the result that the existing generalized speed and the excitation are in phase. Therefore, there is no need to wait until mechanical oscillators which are oscillating out of phase have been damped and the mechanical relaxation of the system has thus ended.

A modified method of operation is also possible to the effect that only the phase of the exciting force is set. Since resonance is characterized in that the phase shift between the force and the generalized speed becomes zero, the resonance condition can also be achieved very quickly by purely setting the phase.

According to an exemplary embodiment, a measuring device can be configured in such a manner that the measuring system is deliberately operated beside the resonant frequency. The frequency and/or phase of the exciting force is/are then set as described above, but the condition can be to, for example, set a defined, predefinable distance from the resonant frequency and/or a defined, predefinable phase which is different from zero.

According to an exemplary embodiment, the sudden phase change can be achieved by applying a value, which corresponds to the sum of the instantaneous phase angle and the sudden phase change to be generated, for one pass (sampling) of the oscillator.

According to an exemplary embodiment, the frequency generator may be a feedback system, which can be approximately comparable to an infinite impulse response filter (IIR) which oscillates at a predefined frequency, for example. In addition, according to an exemplary embodiment, the amplitude of the oscillator can be kept at a constant value by controlling the sum of the squares of the SIN and COS outputs of the frequency generator in such a manner that this value is always one (1).

The drawing shows a schematic illustration of an exemplary measuring device 10 according to at least one embodiment of the present disclosure. The measuring device 10 can comprise a measuring tube 1 and an electronic unit 9. In the measuring tube 1, a fluid medium can flow from a measuring tube inlet 1E to a measuring tube outlet 1A in the direction of the arrow P illustrated in the drawing. The measuring tube 1 can also have additional attachment parts on the inlet 1E and outlet 1A sides, such as flanges, for example, which can be used to install the measuring tube 1 in a pipeline system of a process installation (e.g., in a pipeline system of a chemical installation or a foodstuffs factory). In addition, further attachment parts, such as balancing elements or parts of a housing, for example, can also be fitted to the measuring tube 1.

An exciter arrangement 2 (also referred to as an actuator 2) can be situated approximately in the centre of the measuring tube 1, according to an exemplary configuration. The exciter arrangement 2 can be configured to excite the measuring tube 1 to oscillate mechanically. The exciter arrangement 2 can be implemented using a plunger coil, for example. The current through the plunger coil l(t) can then be a measure of the force exerted on the measuring tube 1 by the actuator 2. The actuator 2 can act on the measuring tube 1 such that the measuring tube 1 can be excited to carry out bending oscillations or torsional oscillations or, if necessary, in combination with special further attachment parts, combined bending and torsional oscillations. The excitation is effected at an excitation frequency $\omega$. The excitation frequency $\omega$ is predefined for the actuator by a frequency generator (FG) 7 which is a constituent part of the electronic unit 9. The frequency generator 7 will be described in more detail below. The current signal l(t) from the actuator 2 has a phase which is shifted with respect to the excitation $\psi_I$: $l(t) = l(\omega, \psi_I)$.

In a manner symmetrical with respect to the exciter arrangement 2, a first measuring sensor 3 can be situated upstream of the exciter arrangement 2, and a second measuring sensor 4 can be situated downstream of the exciter arrangement 2. The measuring sensors 3, 4 can also be generically referred to as sensors 3, 4 hereinafter. The sensors 3, 4 can register the deflections of the measuring tube 1 and the time derivative of the deflection, that is to say the speed. The signal from the first sensor 3 can be denoted $S_2$ ($\omega$, $\psi_{S2}$). The signal from the first sensor 3 has the excitation frequency $\omega$ but is phase-shifted through the phase $\psi_{S2}$ with respect to the excitation signal. The signal from the second sensor 4 can be denoted $S_1$ ($\omega$, $\psi_{S1}$). The signal from the second sensor 4 has the excitation frequency $\omega$ but is phase-shifted through the phase $\psi_{S1}$ with respect to the excitation signal. Both sensor signals can be supplied to an evaluation unit (EU) 5 which is a constituent part of the electronic unit 9. A first phase shift $\phi = \psi_{S2} - \psi_{S1}$ can be formed in the evaluation unit 5. The first phase shift can be the actual measurement variable of the Coriolis mass flowmeter; it corresponds to the mass flow rate m' of the Coriolis mass flowmeter. In a display unit 8, the mass flow rate can be determined from the first phase shift and be displayed, or the mass flow rate can be passed to a measured value acquisition or control system for further processing via an exemplary data interface, for example.

An average value of the phases $\psi_{S2}$ and $\psi_{S1}$ of the sensors 3, 4 can additionally be determined in the evaluation unit 5. The average value of the phases $\psi_{S2}$ and $\psi_{S1}$ of the sensors 3, 4 is stated, by way of example, as an arithmetic average value $\overline{\psi} = \frac{1}{2}(\psi_{S2} + \psi_{S1})$ in the drawing. However, other types of averaging could also be used, such as a quadratic average value, for example.

According to an exemplary embodiment, the average value of the phases $\psi_{S2}$ and $\psi_{S1}$ of the sensors 3, 4 can be supplied to a phase comparator (PC) 6. The phase comparator 6 can be configured to form the difference from the average value of the phases $\psi_{S2}$ and $\psi_{S1}$ of the sensors 3, 4 and the phase $\psi_I$ of the current signal from the actuator 2.

The second phase shift $\Delta\psi = \overline{\psi} - \psi_I$ obtained in this manner is zero if the frequency $\omega$ at which the actuator 2 excites the measuring tube 1 corresponds to the natural frequency $\omega_0$ of the mechanical system.

The second phase shift $\Delta\psi = \overline{\psi} - \psi_I$ can be supplied to the frequency generator 7 already mentioned above. The frequency, the amplitude and the phase of the second phase shift $\Delta\psi = \overline{\psi} - \psi_I$ can be set in the frequency generator 7.

According to an exemplary embodiment, the setting operation takes place as follows. First of all, the second phase shift $\Delta\psi = \overline{\psi} - \psi_I$ can be determined during the period of an integration interval T0. The frequency generator 7 can then determine a new frequency $\omega$ of the excitation signal l(t) in such a manner that the new phase of the excitation signal is reduced by the value $\Delta\psi$ in comparison with the original phase. In addition, the frequency generator 7 can determine a new frequency $\omega$ of the excitation signal l(t) such that the new phase corresponds to the sum of the instantaneous phase angle and the sudden phase change $\Delta\psi$ to be generated.

According to an exemplary embodiment, the new frequency $\omega$ of the excitation signal l(t) determined in this manner can be impressed on the excitation signal, and the second phase shift $\Delta\psi = \overline{\psi} - \psi_I$ can be determined again during a second period $T_1$. If the second phase shift $\Delta\psi = \overline{\psi} - \psi_I$ has not yet become zero, the previous operation can be repeated.

According to an exemplary embodiment, an excitation frequency at which the mechanical system oscillates at its natural frequency $\omega_0$ is reached in this manner with very few iteration steps. This is because, when setting the new frequency, the new phase is simultaneously set in such a manner that the second phase shift $\Delta\psi$ disappears and the frequency $\omega$ at which the actuator 2 excites the measuring tube 1 thus corresponds to the natural frequency $\omega_0$ of the mechanical system.

According to an exemplary embodiment, the frequency generator can be a feedback system, for example, approximately comparable to an infinite impulse response filter (IIR) which oscillates at a predefined frequency. Such a feedback system can have a SIN output and a COS output for this purpose. The amplitude of the oscillator can be kept at a constant value by controlling the sum of the squares of the SIN and COS outputs of the frequency generator 7 in such a manner that this value is always one (1).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Measuring tube
1E Measuring tube inlet
1A Measuring tube outlet

2 Exciter arrangement, actuator
3 Sensor, measuring sensor
4 Sensor, measuring sensor
5 Evaluation unit with averaging unit
6 Phase comparator
7 Frequency generator
8 Display unit
9 Electronic unit
10 Measuring device
P Direction of flow

What is claimed is:

1. A Coriolis flow sensor comprising:
    an exciter arrangement configured to exert a time-dependent, periodic force on a measuring tube arranged to allow a medium to flow therethrough, and to cause the measuring tube to oscillate;
    a phase comparator configured to determine a phase shift between the force and a sensor signal; and
    a frequency generator configured to set an excitation frequency and a phase of the force to be exerted by the exciter arrangement, on the basis of the phase shift determined by the phase comparator.

2. The Coriolis flow sensor according to claim 1, wherein the frequency generator is configured to set the frequency, amplitude and phase of the force to be exerted by the exciter arrangement.

3. The Coriolis flow sensor according to claim 1, wherein the frequency generator is a feedback system which is configured to be oscillated at a predefinable frequency.

4. The Coriolis flow sensor according to claim 1, comprising:
    at least one first measuring sensor configured to output a first measurement signal; and
    at least one second measuring sensor configured to output a second measurement signal,
    wherein the phase comparator is configured to determine an average value of the first sensor signal and the second sensor signal,
    wherein the frequency generator is configured to control the phase and frequency of the force to be exerted such that the frequency corresponds to a natural frequency of the measuring device and the phase difference between the sensor signal or the average value of the first and second sensor signals and the force becomes zero.

5. The Coriolis flow sensor according to claim 1, comprising:
    at least one first measuring sensor configured to output a first measurement signal; and
    at least one second measuring sensor configured to output a second measurement signal,
    wherein the phase comparator is configured to determine an average value of the first sensor signal and the second sensor signal, and to determine a second phase shift between the force to be exerted and the average value of the first sensor signal and the second sensor signal, and
    wherein the frequency generator is configured to set the exite the frequency on the basis of the second phase shift determined by the phase comparator.

6. The Coriolis flow sensor according to claim 1, comprising:
    at least one first measuring sensor configured to output a first measurement signal;
    at least one second measuring sensor configured to output a second measurement signal; and
    an evaluation unit configured to determine the phases of at least some of the measurement signals,
    wherein the phase comparator is configured to determine an average value of the first sensor signal and the second sensor signal.

7. The Coriolis flow sensor according to claim 6, wherein the evaluation unit is configured to determine a first phase shift between the first measurement signal and the second measurement signal, and determine a measurement variable of the medium based on the determined first phase shift.

8. The Coriolis flow sensor according to claim 7, wherein the frequency generator is configured to set the frequency, amplitude and phase of the force to be exerted by the exciter arrangement.

9. The Coriolis flow sensor according to claim 6,
    wherein the phase comparator is configured to determine a second phase shift between the force to be exerted and the average value of the first sensor signal and the second sensor signal, and
        wherein the frequency generator is configured to be programmed directly with a measured value of the second phase shift.

10. The Coriolis flow sensor according to claim 9, wherein the frequency generator is a feedback system which is configured to be oscillated at a predefinable frequency.

11. A method of operating a Coriolis flow sensor, the method comprising:
    exerting a time-dependent, periodic force on a measuring tube arranged to allow a medium to flow therethrough, to cause the measuring tube to oscillate;
    determining a phase shift between the force and a sensor signal; and
    setting an excitation frequency and/or a phase of the force to be exerted on the basis of the determined phase shift.

12. The method according to claim 11, comprising:
    measuring the determined phase shift;
    utilizing the measured phase shift to program a frequency generator in which the frequency, the amplitude and the phase of the force to be exerted is settable, such that a resonant frequency of the measuring device is trackable faster than with using only the frequency of the force to be exerted.

13. The method according to claim 11, wherein a sudden phase change is achievable by applying a value, which corresponds to a sum of an instantaneous phase angle and the sudden phase change to be generated, for one pass of an oscillator configured to exert the force to be exerted.

14. A Coriolis flow sensor device comprising:
    an exciter arrangement configured to exert a time-dependent, periodic force on a measuring tube arranged to allow a medium to flow therethrough, and to cause the measuring tube to oscillate;
    a first measuring sensor fitted to a first side of the measuring tube, and configured to output a first measurement signal;
    a second measuring sensor fitted to a second side of the measuring tube opposite to the first side of the measuring tube, and configured to output a second measurement signal; and
    an evaluation unit configured to determine a phase shift between the first and second measurement signals and determine a measurement variable of the medium flowing through the measuring tube on the basis of the determined phase shift.

* * * * *